(12) United States Patent
Fujii et al.

(10) Patent No.: US 9,698,984 B2
(45) Date of Patent: Jul. 4, 2017

(54) RE-ENCRYPTED DATA VERIFICATION PROGRAM, RE-ENCRYPTION APPARATUS AND RE-ENCRYPTION SYSTEM

(71) Applicants: Kabushiki Kaisha Toshiba, Minato-ku (JP); Toshiba Solutions Corporation, Kawasaki-shi (JP)

(72) Inventors: Yoshihiro Fujii, Tokyo (JP); Takuya Yoshida, Inagi (JP); Koji Okada, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 250 days.

(21) Appl. No.: 14/480,073

(22) Filed: Sep. 8, 2014

(65) Prior Publication Data

US 2015/0043735 A1    Feb. 12, 2015

Related U.S. Application Data

(63) Continuation of application No. PCT/JP2013/050226, filed on Jan. 9, 2013.

(30) Foreign Application Priority Data

Mar. 28, 2012    (JP) .................................. 2012-074773

(51) Int. Cl.
*H04L 29/06* (2006.01)
*G06F 21/00* (2013.01)
(Continued)

(52) U.S. Cl.
CPC .............. *H04L 9/14* (2013.01); *H04L 9/0827* (2013.01); *H04L 9/30* (2013.01); *H04L 9/3073* (2013.01);
(Continued)

(58) Field of Classification Search
CPC . H04L 9/14; H04L 9/3247; H04L 9/30; H04L 9/3073; H04L 9/0827; H04L 2209/24; H04L 2209/76
See application file for complete search history.

(56) References Cited

U.S. PATENT DOCUMENTS 6,226,618 B1  5/2001  Downs et al.
6,263,313 B1  7/2001  Milsted et al.
(Continued)

FOREIGN PATENT DOCUMENTS

JP    2004-363779 A    12/2004
JP       4010766 B2     9/2007

OTHER PUBLICATIONS

Extended European Search Report issued Nov. 16, 2015 in Patent Application No. 13767295.2.
(Continued)

*Primary Examiner* — Lisa Lewis
(74) *Attorney, Agent, or Firm* — Oblon, McClelland, Maier & Neustadt, L.L.P.

(57) ABSTRACT

In a decryption apparatus according to an embodiment, a holding device pre-holds a verification formula. A determination device performs a calculation based on the verification formula read from the holding device by substituting, into the verification formula, the part of the re-encrypted data received from a re-encryption apparatus and the public key of a re-encryption key generation apparatus and the private key of the decryption apparatus, to determine whether or not the verification formula holds true. An output device outputs verification success when a result of the determination indicates that the verification formula holds true.

6 Claims, 9 Drawing Sheets

(51) Int. Cl.
*H04L 9/14* (2006.01)
*H04L 9/08* (2006.01)
*H04L 9/30* (2006.01)
*H04L 9/32* (2006.01)

(52) U.S. Cl.
CPC ........ *H04L 9/3247* (2013.01); *H04L 2209/24* (2013.01); *H04L 2209/76* (2013.01)

(56) References Cited

U.S. PATENT DOCUMENTS

| | | |
|---|---|---|
| 6,345,256 B1 | 2/2002 | Milsted et al. |
| 6,389,403 B1 | 5/2002 | Dorak, Jr. |
| 6,389,538 B1 | 5/2002 | Gruse et al. |
| 6,398,245 B1 | 6/2002 | Gruse et al. |
| 6,418,421 B1 | 7/2002 | Hurtado et al. |
| 6,574,609 B1 | 6/2003 | Downs et al. |
| 6,587,837 B1 | 7/2003 | Spagna et al. |
| 6,611,812 B2 | 8/2003 | Hurtado et al. |
| 6,859,791 B1 | 2/2005 | Spagna et al. |
| 6,915,434 B1 | 7/2005 | Kuroda et al. |
| 6,959,288 B1 | 10/2005 | Medina et al. |
| 6,983,371 B1 | 1/2006 | Hurtado et al. |
| 7,110,984 B1 | 9/2006 | Spagna et al. |
| 7,206,748 B1 | 4/2007 | Gruse et al. |
| 7,228,437 B2 | 6/2007 | Spagna et al. |
| 7,269,564 B1 | 9/2007 | Milsted et al. |
| 7,346,580 B2 | 3/2008 | Lisanke et al. |
| 7,383,228 B2 | 6/2008 | Lisanke et al. |
| 7,487,128 B2 | 2/2009 | Spagna et al. |
| 7,590,866 B2 | 9/2009 | Hurtado et al. |
| 7,962,413 B2 | 6/2011 | Lisanke et al. |
| 7,962,750 B1 | 6/2011 | Gruse et al. |
| 8,180,708 B2 | 5/2012 | Hurtado et al. |
| 8,347,093 B1 | 1/2013 | Ahmed |
| 2002/0002648 A1 | 1/2002 | Kawase et al. |
| 2002/0107803 A1 | 8/2002 | Lisanke et al. |
| 2003/0105718 A1 | 6/2003 | Hurtado et al. |
| 2005/0251491 A1 | 11/2005 | Medina et al. |
| 2006/0085343 A1 | 4/2006 | Lisanke et al. |
| 2006/0089912 A1 | 4/2006 | Spagna et al. |
| 2006/0095792 A1 | 5/2006 | Hurtado et al. |
| 2008/0144813 A1* | 6/2008 | Furukawa ............. H04L 9/3066 380/30 |
| 2008/0172747 A1 | 7/2008 | Hurtado et al. |
| 2010/0008500 A1 | 1/2010 | Lisanke et al. |

OTHER PUBLICATIONS

Search Report and Examination Report issued Feb. 11, 2015 in Singaporean Patent Application No. 11201405579R.
International Preliminary Report on Patentability and Written Opinion issued Oct. 9, 2014, in International Application No. PCT/JP2013/050226.
A. Menezes, et al., "Handbook of Applied Cryptography", 11.6 "One-time digital signatures", CRC Press, Oct. 1996, pp. 462-471.
International Search Report mailed Feb. 26, 2013 for PCT/JP2013/050226 filed Jan. 9, 2013 with English Translation.
International Written Opinion mailed Feb. 26, 2013 for PCT/JP2013/050226 filed Jan. 9, 2013.
M. Blaze et al., "Atomic Proxy Cryptography", AT&T Labs—Research TR98.5.1, Nov. 1997.
M. Blaze et al., "Divertible Protocols and Atomic Proxy Cryptography", In Eurocrypt' 98, LNCS 1403, pp. 127-144, 1998.
G. Ateniese et al., "Improved Proxy Re-Encryption Schemes with Applications to Secure Distributed Storage", In NDSS' 05, 2005.
B. Libert et al., "Tracing Malicious Proxies in Proxy Re-Encryption", In Pairing 2008, 2008.
R. Canetti et al., "Chosen-Ciphertext Secure Proxy Re-Encryption", In ACM CCS' 07, 2005.
M. Green et al., "Identity-Based Proxy Re-Encryption", In ACNS' 07, 2007.
T. Matsuo, "Proxy Re-encryption Systems for Identity-based Encryption", In Pairing 2007, 2007.
B. Libert et al., "Unidirectional Chosen-Ciphertext Secure Proxy Re-Encryption", Public Key Cryptography 2008.
G. Ateniese et al., "Proxy Re-Signatures: New Definitions, Algorithms, and Applications", ACM Conference on Computer and Communications Security 2005, pp. 310-319.

* cited by examiner

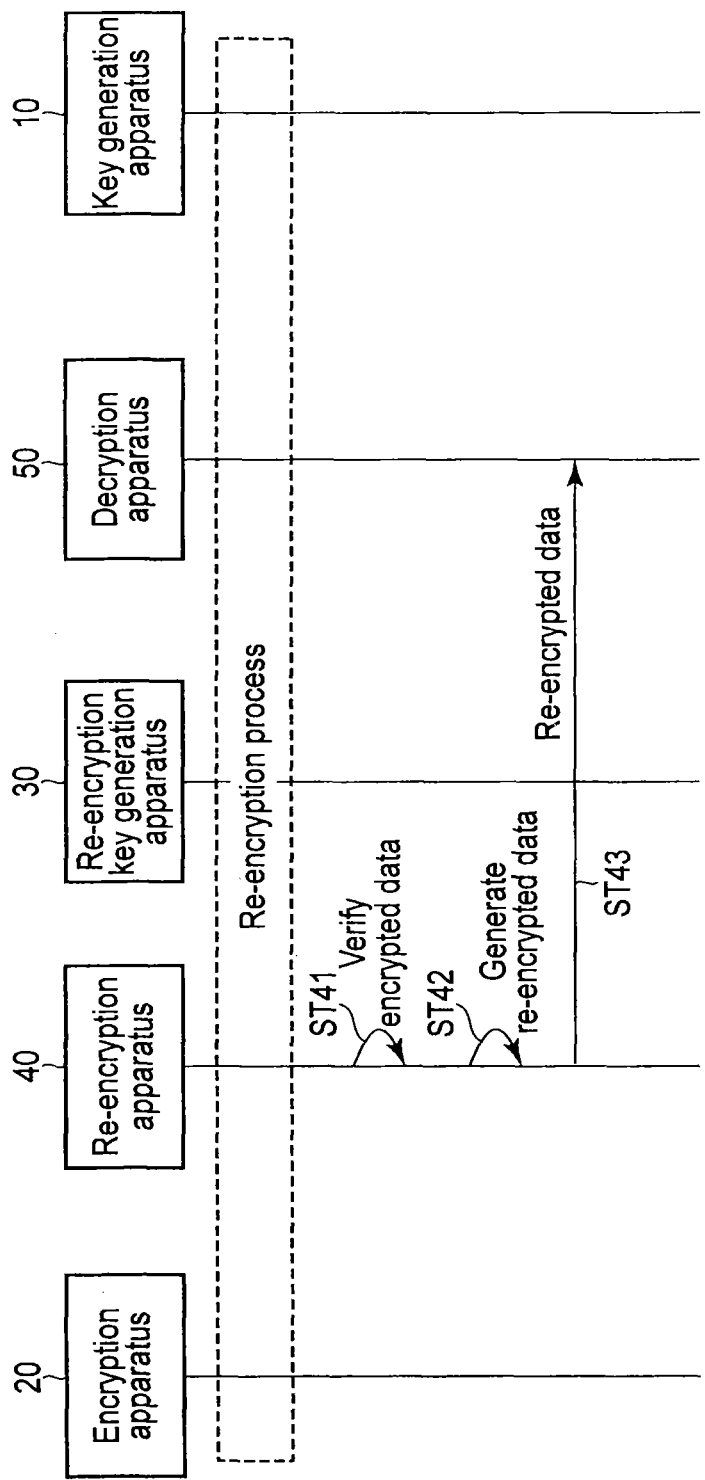
F I G. 5

US 9,698,984 B2

RE-ENCRYPTED DATA VERIFICATION PROGRAM, RE-ENCRYPTION APPARATUS AND RE-ENCRYPTION SYSTEM

CROSS-REFERENCE TO RELATED APPLICATIONS

This is a Continuation Application of PCT application No. PCT/JP2013/050226, filed on Jan. 9, 2013, which was published under PCT Article 21(2) in Japanese.

This application is based upon and claims the benefit of priority from Japanese Patent Application No. 2012-074773, filed on Mar. 28, 2012; the entire contents of which are incorporated herein by reference.

FIELD

Embodiments described herein relate generally to a re-encrypted data verification program, a re-encryption apparatus, and a re-encryption system.

BACKGROUND

In 1998, Blaze et al. proposed a technique referred to as proxy re-encryption in connection with a public key encryption system.

A basic model for this technique comprises five functions (hereinafter also referred to as algorithms) for key generation, encryption, decryption, re-encryption key generation, and re-encryption. The functions of key generation, encryption, and decryption are similar to the corresponding functions for normal public key encryption.

(Key generation) KeyGen $(1^k)\rightarrow$(pk, sk)

The key generation algorithm KeyGen outputs a set of a public key pk and a private key (pk, sk) in response to input of a security parameter of $1^k$.

(Encryption) Enc $(pk_A, m)\rightarrow C_A$

The encryption algorithm Enc outputs an encrypted data $C_A$ destined for a user A in response to input of a public key $pk_A$ and a message m of a user A.

(Decryption) Dec $(sk_A, C_A)\rightarrow m$

The decryption algorithm Dec outputs the message m in response to input of the private key $sk_A$ of the user A and the encrypted data $C_A$ destined for the user A.

(Re-encryption key generation) ReKeyGen $(pk_A, sk_A, pk_B, sk_B)\rightarrow rk_{A\rightarrow B}$ The re-encryption key generation algorithm ReKeyGen outputs a re-encryption key $rk_{A\rightarrow B}$ in response to input of the public key $pk_A$ of the user A, the private key $sk_A$ of the user A, a public key $pk_B$ of a user B, and a private key $sk_A$ of the user B.

(Re-encryption) ReEnc $(rk_{A\rightarrow B}, C_A)$

The re-encryption algorithm ReEnc outputs an encrypted data $C_B$ in response to input of the re-encryption key $rk_{A\rightarrow B}$ and the encrypted data $C_A$ destined for the user A.

The basic model has been described. However, the following models have been designed depending on an implementation scheme for re-encryption: a model with inputs to the functions different from the above-described inputs, and a model with functions and keys different from the above-described functions and keys.

For example, in connection with inputs to the re-encryption key generation algorithm, the following models have been designed: a model referred to as a non-interactive model and eliminating the need for the input of the private key $sk_B$ of the user B, and a model involving input of the re-encryption key $rk_{A\rightarrow B}$ destined for the user B and a private key $sk_C$ of a user C instead of the private key $sk_A$ of the user A.

The following models are also known: a model referred to as a unidirectional model and allowing re-encryption $C_A\rightarrow C_B$ to be achieved using the re-encryption key $rk_{A\rightarrow B}$, while unable to carry out the reverse conversion of the encrypted data $C_B\rightarrow C_A$, and a model referred to as a bidirectional model and allowing the reverse conversion to also be achieved. In the bidirectional model, the re-encryption key $rk_{A\rightarrow B}$ may be represented as $rk_{A\leftrightarrow B}$.

Moreover, a scheme based on ID based encryption, a type of public key encryption, has also been designed. This scheme increases the number of function setups for generation of a master key and adds a master key and an ID as inputs to the key generation algorithm KeyGen. In the ID based encryption, the public key pk is the ID itself.

As examples of specific schemes, the following are known: for the unidirectional model, schemes described in G. Ateniese, K. Fu, M. Green, S. Hohenberger. Improved Proxy Re-Encryption Schemes with Applications to Secure Distributed Storage. In NDSS '05, 2005, and B. Libert, D. Vergnaud. Tracing Malicious Proxies in Proxy Re-Encryption. In Pairing 2008, 2008, for the bidirectional model, a scheme described in R. Canetti, S. Hohenberger. Chosen-Ciphertext Secure Proxy Re-Encryption. In ACM CCS '07, 2005, and for the ID based encryption, schemes described in M. Green, G. Ateniese. Identity-Based Proxy Re-encryption. In ACNS '07, 2007, and T. Matsuo. Proxy Re-encryption Systems for Identity-based Encryption. In Pairing 2007, 2007. The embodiments are based on a scheme described in Benoit Libert, Damien Vergnaud, "Unidirectional Chosen-Ciphertext Secure Proxy Re-encryption", Public Key Cryptography 2008, pp. 360-279 (hereinafter, referred to as Non-Patent Literature 8)

FIG. 9 is a schematic diagram showing an example of a content distribution system illustrating a re-encryption technique such as described above. The content distribution system comprises three entities including a content provider 1, a distribution system 2, and a user 3. The user 3 is referred to as user A or user B when the users are distinguished from one another.

In prior arrangement, the content provider 1 is assumed to have a public key $pk_{Gr}$ of the distribution system 2. The distribution system 2 is assumed to have re-encryption keys $rk_{Gr\rightarrow A}$ and $rk_{Gr\rightarrow B}$ used to re-encrypt an encrypted data $(pk_{Gr}, M)$ destined for the distribution system 2 into an encrypted data destined for a particular user A's re-encrypted data $E(pk_A, M)$ or B's re-encrypted data $E(pk_B, M)$. Each user 3 is assumed to have a private key $sk_A$ or $sk_B$ used to decrypt the re-encrypted data E destined for the user 3's encrypted data $E(pk_A, M)$ or $E(pk_B, M)$. Various other keys and parameters will not be described.

Next, the content provider 1 encrypts a data M using the public key $pk_{Gr}$ of the distribution system 2 and distributes the resultant encrypted data E $(pk_{Gr}, M)$ to the distribution system 2.

The distribution system 2 receives the encrypted data E $(pk_{Gr}, M)$ from the content provider 1. Subsequently, in response to a content request received from, for example, the user A, the distribution system 2 re-encrypts the encrypted data E $(pk_{Gr}, M)$ into a re-encrypted data destined for the particular user A's encrypted data $E(pk_A, M)$ based on the re-encryption key for the particular user A $rk_{Gr\rightarrow A}$. The distribution system 2 distributes the resultant re-encrypted data $E(pk_A, M)$ to the user A.

The user A decrypts the re-encrypted data $E(pk_A, M)$ received from any distribution system 2 using the private key $sk_A$, and utilizes the resultant data M.

In the content distribution system as described above, the data M is subjected to no single decryption during a period from the encryption performed by the content provider 1 until the decryption performed by the user A. This enables possible information leakage to be inhibited during a process of content distribution.

Furthermore, the content provider 1 performs encryption using the public key $pk_{Gr}$ of the distribution system 2 without identifying the user 3. Thus, only the public key $pk_{Gr}$ of the distribution system 2 needs to be managed, enabling a reduction in the cost of key management.

The distribution system 2 re-encrypts the encrypted data $E(pk_{Gr}, M)$ for the user 3 without decrypting the encrypted data $E(pk_{Gr}, M)$. This eliminates the need to strictly manage a server used for re-encryption, enabling a reduction in costs.

The user 3 can utilize any data M as in the case of the conventional art simply by issuing a content request to the distribution system 2.

The re-encryption technique as described above normally has no particular problem, but through their research the inventors have found the following disadvantages.

The conventional encryption system comprises two entities, an encrypting person and a decrypting person and has only to be able to identify the decrypting person. In contrast, according to the re-encryption technique, a decrypting person disadvantageously fails to verify for whom encrypted data that has been re-encrypted is originally destined if the decrypting person does not know from whom the decrypting person receives re-encrypted data.

For example, according to the re-encryption technique, a function to generate a re-encryption key can be separated from a function to perform re-encryption, and thus, these functions may be implemented in separate entities. In this case, even when receiving re-encrypted data from an entity that has performed re-encryption, the decrypting user has no means for verifying for whom encrypted data that has been re-encrypted is originally destined.

Therefore, even if a user or a third person who investigates the cause of leakage receives leaked encrypted data that has been re-encrypted, the user or the third person is unable to verify, in this state, for whom the encrypted data that has been re-encrypted is originally destined. Thus, identifying the source of leakage is difficult.

As a candidate for a technique for eliminating the above-described disadvantage, for example, proxy re-signature is known. However, the technique is configured to replace a signature and thus needs to implement a combination of proxy re-signature with proxy re-encryption that achieves the above-described re-encryption function. However, the combination is difficult to realize because the combination involves an increased amount of calculation and an increased data length needed to achieve both functions, and because no suitable method for allowing both systems to cooperate with each other is known.

As another candidate for a technique for eliminating the disadvantage, a technique for combining proxy re-encryption with an existing electronic signature system has been proposed. However, for this technique, it is presently unknown to which data and how the encrypting person and the re-encrypting person may add electronic signatures. Thus, implementing the technique is difficult.

That is, for the re-encryption technique, the above-described disadvantages have not been eliminated.

An object of the embodiments disclosed herein is to provide a re-encrypted data verification program, a re-encryption apparatus, and a re-encryption system wherein a decryption apparatus, upon receiving re-encrypted data, can verify for whom encrypted data that has been re-encrypted is originally destined.

Thus, a case will be described herein where a function to generate a re-encryption key and a function to perform re-encryption are executed by different entities.

BRIEF DESCRIPTION OF THE DRAWINGS

FIG. 5 is a sequence diagram illustrating the operation of a re-encryption process according to the first embodiment.

DETAILED DESCRIPTION

Figure 1:
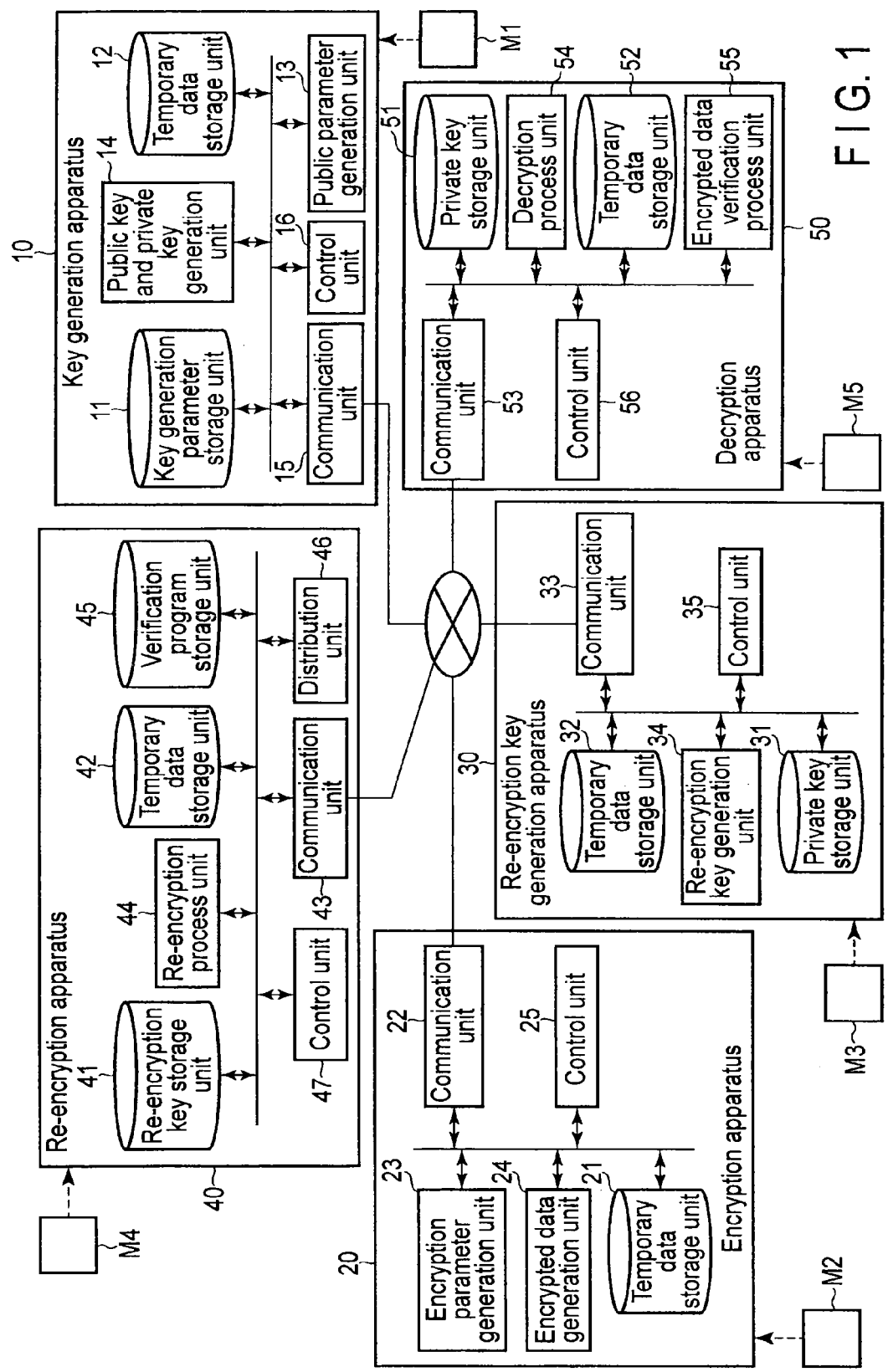
FIG. 1 is a schematic diagram showing a configuration of a re-encryption system according to a first embodiment.

In general, according to one embodiment, a re-encryption system comprises an encryption apparatus, a re-encryption key generation apparatus, a re-encryption apparatus, and a decryption apparatus.

In the encryption apparatus, a first storage device stores a public key of the re-encryption apparatus. An encryption device executes an encryption process on the plain unencrypted data using the public key of the re-encryption apparatus read from the first storage device, to obtain encrypted data. The encryption apparatus transmits the resultant encrypted data to the re-encryption apparatus.

In the re-encryption key generation apparatus, a second storage device stores a private key corresponding to the public key of the re-encryption apparatus and a public key corresponding to a private key of the decryption apparatus. The re-encryption key generation apparatus generates a re-encryption key using the private key of the re-encryption apparatus and the public key of the decryption apparatus, both having been read from the second storage device. The re-encryption key generation apparatus transmits the generated re-encryption key to the re-encryption apparatus.

In the re-encryption apparatus, a third storage device stores the re-encryption key received from the re-encryption key generation apparatus. A re-encryption device, upon receiving the encrypted data from the encryption apparatus, executes a re-encryption process on the encrypted data using the re-encryption key read from the third storage device without decrypting the encrypted data, to obtain re-encrypted data. The re-encryption apparatus transmits the resultant re-encrypted data to the decryption apparatus.

The decryption apparatus comprises a fourth storage device, a decryption device, a holding device, a determination device, and an output device. The fourth storage device stores the public key of the re-encryption apparatus and the private key of the decryption apparatus.

The decryption device, upon receiving the re-encrypted data from the re-encryption apparatus, executes a decryption process on the re-encrypted data based on the private key of the decryption apparatus read from the fourth storage device, to obtain the plain data.

The holding device pre-holds a verification formula that holds true when the verification formula is calculated by substituting into the verification formula, a part of the re-encrypted data used for the re-encryption system, the public key used for the encryption process executed on the encrypted data before the re-encryption process is executed on the re-encrypted data, and a private key that enables the re-encrypted data to be decrypted.

The determination device performs a calculation based on the verification formula read from the holding device by substituting, into the verification formula, the part of the re-encrypted data received from the re-encryption apparatus, and the public key of the re-encryption key generation apparatus and the private key of the decryption apparatus read from the forth storage device, to determine whether or not the verification formula holds true.

The output device outputs verification success indicating that the public key used for the encryption process executed on the plain data is the public key of the re-encryption key generation apparatus when a result of the determination indicates that the verification formula holds true.

Embodiments will be described below with reference to the drawings. Apparatuses described below can each be implemented using a hardware configuration or a combined configuration of hardware resources and software. As the software in the combined configuration, a program is used which is pre-installed in each computer from a network or non-transitory computer-readable storage media M1 to M5 and which is executed by a processor in the computer to allow the computer to achieve functions of the respective apparatuses, as shown in FIG. 1.

(First Embodiment)

FIG. 1 is a schematic diagram showing a configuration of a re-encryption system according to a first embodiment. The re-encryption system comprises a key generation apparatus 10, an encryption apparatus 20, a re-encryption key generation apparatus 30, a re-encryption apparatus 40, and a decryption apparatus 50. The key generation apparatus 10 generates various parameters for the re-encryption system and pairs each of a public key and a private key for the apparatuses 40 and 50.

The encryption apparatus 20 executes an encryption process on plain data using the public key corresponding to the private key of the re-encryption key generation apparatus 30, and transmits the resultant encrypted data to the re-encryption apparatus 40.

The re-encryption key generation apparatus 30 generates a re-encryption key using the private key of the re-encryption key generation apparatus 30 and the public key of the decryption apparatus 50. The re-encryption key generation apparatus 30 subsequently transmits the re-encryption key to the re-encryption apparatus 40.

The re-encryption apparatus 40 executes a re-encryption process on the encrypted data received from the encryption apparatus 20 using the re-encryption key transmitted by the re-encryption key generation apparatus 30 without decrypting the encrypted data, and transmits the resultant re-encrypted data to the decryption apparatus 50.

The decryption apparatus 50 executes a verification process on the re-encrypted data using the public key of the re-encryption key generation apparatus 30 and executes a decryption process on the re-encrypted data using the private key corresponding to the public key of the decryption apparatus 50, to obtain plain data. A plurality of the re-encryption key generation apparatuses 30, a plurality of the re-encryption apparatuses 40, and a plurality of the decryption apparatuses 50 may be provided. However, in this case, a single re-encryption key generation apparatus 30, a single re-encryption apparatus 40, and a single decryption apparatus 50 are provided by way of example.

Now, configurations of the apparatuses 10 to 50 will be described.

The key generation apparatus 10 comprises a key generation parameter storage unit 11, a temporary data storage unit 12, a public parameter generation unit 13, a public key and private key generation unit 14, a communication unit 15, and a control unit 16.

The key generation parameter storage unit 11 is a storage apparatus that stores key generation parameters.

The temporary data storage unit 12 is a storage apparatus that stores temporary data such as data originating from processes being executed by the generation units 13 and 14 and the results of the processes.

The public parameter generation unit 13 generates public parameters for key generation.

The public key and private key generation unit 14 generates a public key and a private key destined for a user.

The communication unit 15 is a communication interface that allows communications with the other apparatuses 20 to 50. The communication unit 15 has, for example, a function to transmit the public and private key pairs of 30 and 50 in the temporary data storage unit to the apparatuses 30 and 50 under the control of the control unit 16, and a function to transmit the public key of the re-encryption key generation apparatus 30 in the temporary data storage unit 12 to the encryption apparatus 20 under the control of the control unit 16. In the description below, the description of intervention of the communication unit 15 for transmissions may be omitted in order to avoid redundant descriptions in connection with the transmissions. This also applies to communication units of the other apparatuses 20 to 50.

Figure 2:
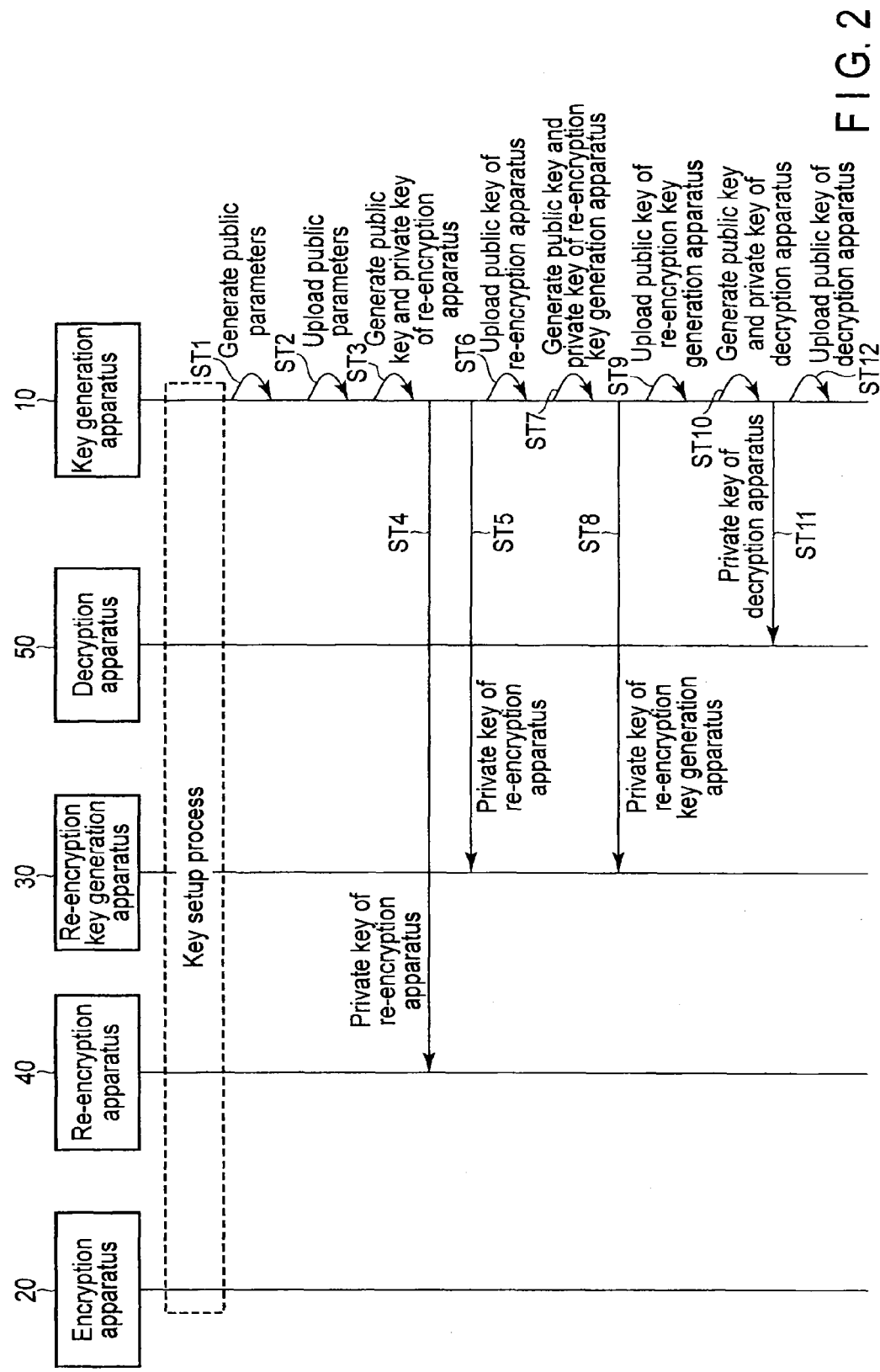
FIG. 2 is a sequence diagram illustrating the operation of a key setup process according to the first embodiment.

The control unit 16 has a function to control the units 11 to 15 so that the units 11 to 15 can perform operations shown in FIG. 2.

The encryption apparatus 20 comprises a temporary data storage unit 21, a communication unit 22, an encryption parameter generation unit 23, an encrypted data generation unit 24, and a control unit 25.

The temporary data storage unit 21 is a storage apparatus that stores the public key of the re-encryption key generation apparatus 30 received from the key generation apparatus 10 and temporary data such as data originating from processes being executed by the generation units 23 and 24 and the results of the processes (hereinafter also referred to as temporary data). The communication unit 22 is a communication interface that allows communications with the other apparatuses 10 and 30 to 50. The communication unit 22 has, for example, a function to acquire the public key of the re-encryption key generation apparatus 30 released to the key generation apparatus 10 to write the public key to the temporary data storage unit 21 and a function to transmit the encrypted data in the temporary data storage unit 21 to the re-encryption apparatus 40 under the control of the control unit 25.

The encryption parameter generation unit 23 has a function to generate encryption parameters.

The encrypted data generation unit 24 apparatus has a function to execute an encryption process on plain data using the public key of the re-encryption key generation apparatus 30 read from the temporary data storage unit 21 to generate encrypted data and a function to write the resultant encrypted data to the temporary data storage unit 21.

Figure 3:
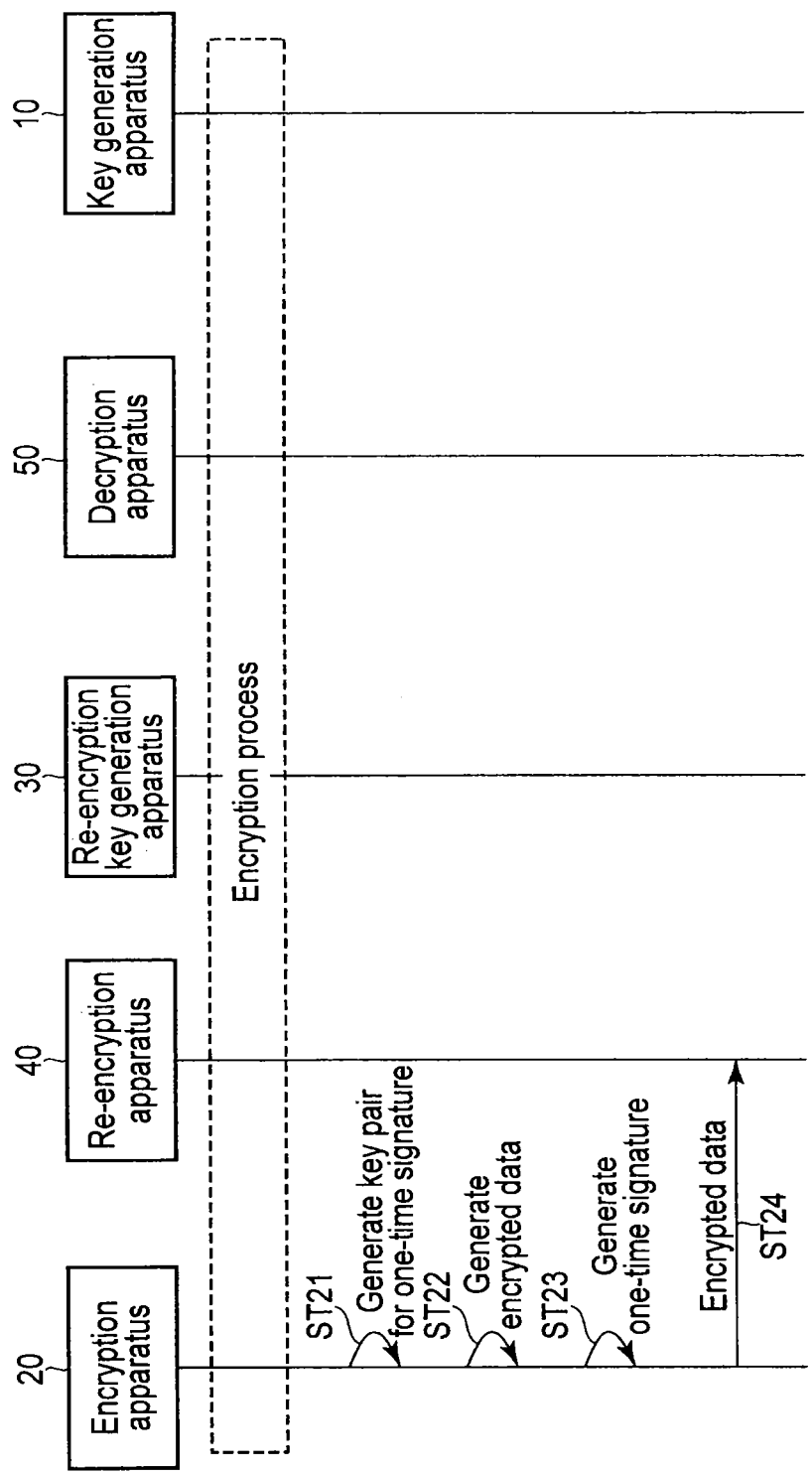
FIG. 3 is a sequence diagram illustrating the operation of an encryption process according to the first embodiment.

The control unit 25 has a function to control the units 21 to 24 so that the units 21 to 24 can perform operations shown in FIG. 3.

The re-encryption key generation apparatus 30 comprises a private key storage unit 31, a temporary data storage unit 32, a communication unit 33, a re-encryption key generation unit 34, and a control unit 35.

The private key storage unit 31 is a storage apparatus that stores the private key of the re-encryption key generation apparatus 30 received from the key generation apparatus 10.

The temporary data storage unit 32 is a storage apparatus that stores the public key of the decryption apparatus 50 received from the key generation apparatus 10 and temporary data such as data originating from processes being executed by the re-encryption key generation apparatus 34 and the results of the processes.

The communication unit 33 is a communication interface that allows communications with the other apparatuses 10, 20, 40, and 50. The communication unit 33 has, for example, a function to transmit the re-encryption key in the temporary data storage unit 32 to the re-encryption apparatus 40 under the control of the control unit 35.

The re-encryption key generation unit 34 has a function to generate a re-encryption key using the private key of the re-encryption key generation apparatus 30 read from the private key storage unit 31 and the public key of the decryption apparatus 50 read from the temporary data storage unit 32 and a function to write the re-encryption key to the temporary data storage unit 32.

Figure 4:
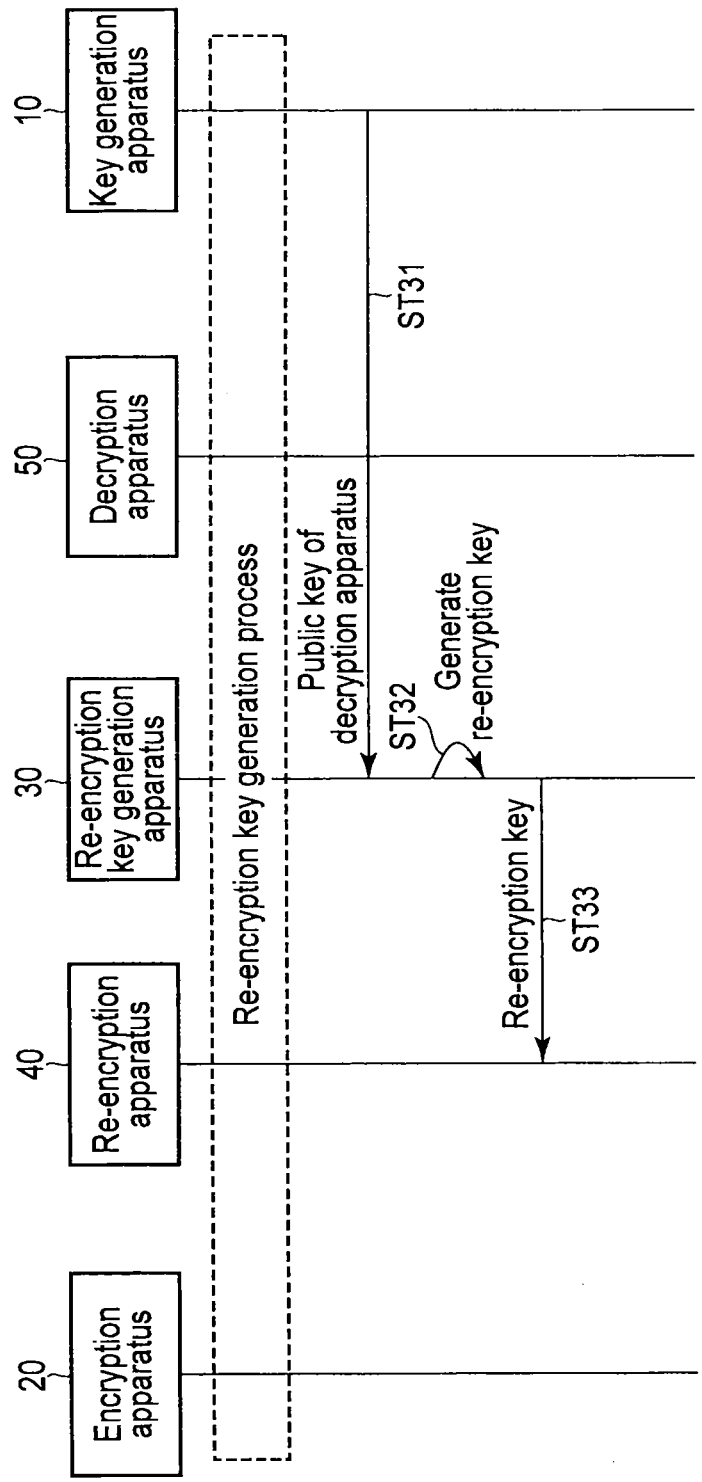
FIG. 4 is a sequence diagram illustrating the operation of a re-encryption key generation process according to the first embodiment.

The control unit 35 has a function to control the units 31 to 34 so that the units 31 to 34 can perform operations shown in FIG. 4.

The re-encryption apparatus 40 comprises a re-encryption key storage unit 41, a temporary data storage unit 42, a communication unit 43, a re-encryption process unit 44, a verification program storage unit 45, a distribution unit 46, and a control unit 47.

The re-encryption key storage unit 41 is a storage apparatus that stores the re-encryption key received from the re-encryption key generation apparatus 30.

The temporary data storage unit 42 is a storage apparatus that stores temporary data such as data originating from processes being executed by the re-encryption process unit 44 and the results of the processes.

The communication unit 43 is a communication interface that allows communications with the other apparatuses 10 to 30 and 50. The communication unit 43 has, for example, a function to deliver the encrypted data received from the encryption apparatus 20 to the re-encryption process unit 44, a function to transmit re-encrypted data in the temporary data storage unit 42 to the decryption apparatus 50 under the control of the control unit 47, and a function to transmit a re-encrypted data verification program in the verification program storage unit 45 to the decryption apparatus 50 under the control of the distribution unit 46.

The re-encryption process unit 44 has a function to execute, upon receiving the encrypted data from the encryption apparatus 20, a re-encryption process on the encrypted data using the re-encryption key read from the re-encryption key storage unit 41 without decrypting the encrypted data to obtain re-encrypted data, and a function to write the resultant re-encrypted data to the temporary data storage unit 42.

The verification program storage unit 45 is a storage apparatus that stores the re-encrypted data verification program. The re-encryption key storage unit 41 and the verification program storage unit 45 may be implemented as separate storage areas in the same storage apparatus or as separate storage apparatuses.

The distribution unit 46 has a function to distribute, upon receiving a distribution request for the re-encrypted data verification program from the decryption apparatus 50, the re-encrypted data verification program in the verification program storage unit 45 from the communication unit 43 to the decryption apparatus 50.

The verification program storage unit 45 is located in the re-encryption apparatus 40, which distributes the re-encrypted data verification program in the verification program storage unit 45 through the distribution unit 46. However, an apparatus other than the re-encryption apparatus 40 may perform the distribution. This is because the above-described configuration is only an example of the embodiment, and because an apparatus other than the re-encryption apparatus 40 may distribute the re-encrypted data verification program. Specifically, the key generation apparatus 10 may distribute the re-encrypted data verification program to the decryption apparatus 50, described below, or the re-encryption key generation apparatus 30 may distribute the re-encrypted data verification program to the decryption apparatus 50, described below.

The control unit 47 has a function to control the units 41 to 46 so that the units 41 to 46 can perform an operation of distributing the re-encrypted data verification program (not shown in the drawings) and operations shown in FIG. 5.

The decryption apparatus 50 comprises a private key storage unit 51, a temporary data storage unit 52, a communication unit 53, a decryption process unit 54, an encrypted data verification process unit 55, and a control unit 56.

The private key storage unit 51 is a storage apparatus that stores the private key of the decryption apparatus 50 received from the key generation apparatus 10.

The temporary data storage unit 52 is a storage apparatus that stores the private key of the decryption apparatus 50 received from the key generation apparatus 10 and the public key of the re-encryption key generation apparatus 30, temporary data such as data originating from processes being executed by the decryption process unit 54 and the encrypted data verification process unit 55, and the results of the processes.

The communication unit 53 is a communication interface that allows communications with the other apparatuses 10 to 40. The communication unit 53 has, for example, a function to write the private key of the decryption apparatus 50 received from the key generation apparatus 10 to the private key storage unit 51, a function to write the public key of the decryption apparatus 50 received from the key generation apparatus 10 and the public key of the re-encryption key generation apparatus 30 to the temporary data storage unit 52, and a function to deliver the re-encrypted data received from the re-encryption apparatus 40 to the decryption process unit 54.

The decryption process unit 54 has a function to execute, upon receiving the re-encrypted data from the re-encryption apparatus 40, a decryption process on the re-encrypted data based on the private key of the decryption apparatus 50 read from the private key storage unit 51 to obtain plain data, and a function to write the resultant plain data to the temporary data storage unit 52.

The encrypted data verification process unit 55 has the following functions (f55-1) to (f55-3).

(f55-1) A holding function to pre-hold a verification formula that holds true when the verification formula is calculated by substituting into the verification formula, a part of the re-encrypted data used for the re-encryption system, the public key used for the encryption process executed on encrypted data before the re-encryption process is executed on the re-encrypted data, and the private key that enables the re-encrypted data to be decrypted. The holding function to pre-hold the verification formula may be interchanged with a holding function to hold a program code in which the verification formula is pre-described.

(f55-2) A determination function to perform a calculation based on the verification formula read from the holding function by substituting into the verification formula, the part of the re-encrypted data received from the re-encryption apparatus, the public key of the re-encryption key generation apparatus 30 read from the temporary data storage unit 52, and the private key of the decryption apparatus 50 in the private key storage unit 51 to determine whether or not the verification formula holds true.

(f55-3) A function to output verification success indicating that the public key used for the encryption process executed on the plain data is the public key of the re-encryption key generation apparatus 30 when the result of the determination indicates that the verification formula holds true.

Figure 6:
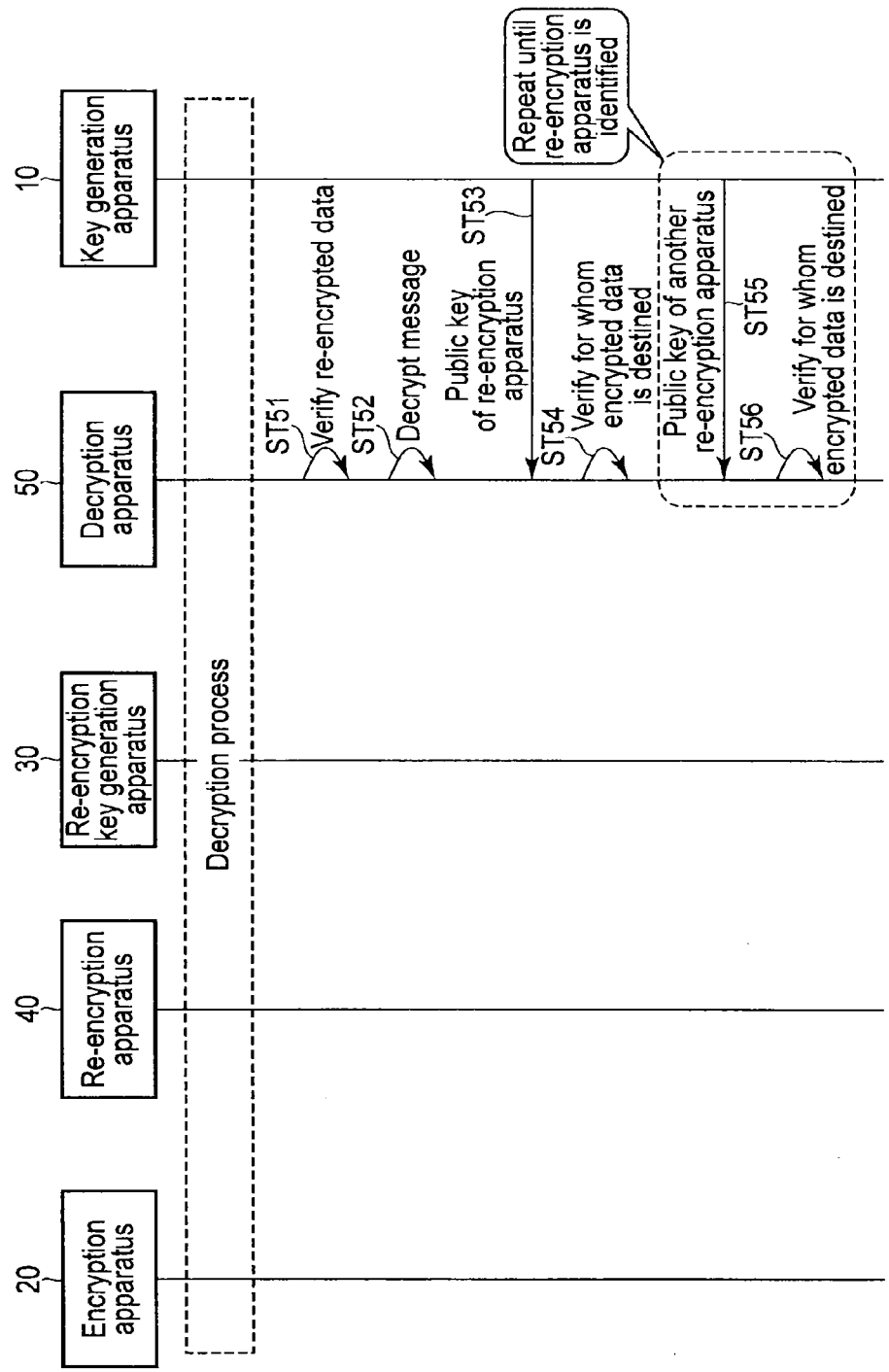
FIG. 6 is a sequence diagram illustrating the operation of a decryption process according to the first embodiment.

The control unit 56 has a function to control the units 51 to 55 so that the units 51 to 55 can perform the operations shown in FIG. 6.

Next, the operations of the re-encryption system configured as described above will be described using sequence diagrams shown in FIGS. 2 to 6. The decryption apparatus 50 is assumed to have transmitted a distribution request for the re-encrypted data verification program to the re-encryption apparatus 40 and to be executing the re-encrypted data verification program received from the distribution unit 46 of the re-encryption apparatus 40.

Furthermore, the following operations will be described taking an example case where a (1) key setup process, an (2) encryption process, a (3) re-encryption key generation process, a (4) re-encryption process, and a (5) decryption process are executed in this order. However, the operations described below need not necessarily involve the execution of the processes in the above-described order. For example, the generation of a re-encryption key may precede the encryption process. Furthermore, the encrypted data may be decrypted without execution of the re-encryption process.

Furthermore, the operations will be described using the technique described in Non-Patent Literature 8 by way of example, except for a process executed by the encrypted data verification process unit 55 in the decryption apparatus 50. That is, the processes other than the process executed by the encrypted data verification process unit 55 can be more deeply understood with supplementary reference to Non-Patent Literature 8.

(1) The key setup process is executed by the key generation apparatus 10 as illustrated in FIG. 2 and steps ST1 to ST12 described below.

First, the public parameter generation unit 13 of the key generation apparatus 10 generates public parameters (p, $\lambda$, G, $G_T$, g, u, v, Sig) (ST1). Specifically, the public parameter generation unit 13 selects, based on a security parameter $\lambda$ pre-stored in the key parameter storage unit 11, bilinear map groups (G, $G_T$) that satisfy a prime order p>2$\lambda$, generators g, u, v∈G, and a one-time signature Sig ($\hat{G}$, $\hat{S}$, $\hat{V}$) satisfying strong unforgeability.

Here, $\hat{G}$ in the one-time signature Sig ($\hat{G}$, $\hat{S}$, $\hat{V}$) (Sig($\hat{G}$, $\hat{S}$, $\hat{V}$) is hereinafter also referred to as Sig) means a function to generate a one-time key pair (ssk, svk), $\hat{S}$ means a function to generate a signature σ for a message M, and $\hat{V}$ means a function to verify validity.

The one-time signature is described in detail in A. Menezes, P. van Oorschot, S. Vanstone, "Handbook of Applied Cryptography", CRC Press, (1996). Furthermore, G and $G_T$ are group sets defined by elliptic curves and used for a pairing function such as shown below.

Pairing function: e ($g_1$, $g_2$)=$g_T$ where $g_1$, $g_2$∈G and $g_T$∈$G_T$.

The pairing function has such a property as shown in the following formula:

$$e(g^a, g) = s(g, g^a) = e(g, g)^a \text{ where } g \in G \text{ and } a \in Z_p.$$

Subsequently, the public parameter generation unit 13 writes the generated public parameters to the temporary data storage unit 12. The key generation apparatus 10 uploads the public parameters (p, $\lambda$, G, $G_T$, g, u, v, Sig) stored in the temporary data storage unit 12 (ST2).

Furthermore, when identification information on the re-encryption key generation apparatus 30 is denoted by i, the public key and private key generation unit 14 generates a private key $x_i \in Z_p^*$ of the re-encryption key generation apparatus 30 and uses the private key $x_i$ to generate a public key $X_i = g^{x_i}$ of the re-encryption key generation apparatus 30.

Note that $Z_p^*$ is a set of integers which are $Z_p$ and which are coprime to p (=(Z/pZ)*) and may also be referred to as a multiplicative group $Z_p^*$ for a prime number p. $Z_p$ is a set of integers equal to or larger than 0 and smaller than p (=(Z/pZ)*).

Subsequently, the public key and private key generation unit 14 writes the generated public and private key pair to the temporary data storage unit 12. The communication unit 15 transmits the private key $x_i$ in the temporary data storage unit 12 to the re-encryption key generation apparatus 30 under the control of the control unit 16 (ST8). The key generation apparatus 10 uploads a public key $X_i$ of the re-encryption key generation apparatus 30 in the temporary data storage unit 12 (ST9).

Similarly, when identification information on the decryption apparatus 50 is denoted by j, the public key and private key generation unit 14 generates a private key $x_j \in Z_p^*$ of the decryption apparatus 50 and uses the private key $x_j$ to generate a public key $X_j = g^{x_j}$ of the decryption apparatus 50 (ST10).

Subsequently, the public key and private key generation unit 14 writes the generated public and private key pair to the temporary data storage unit 12. The communication unit 15 transmits the private key $x_j$ in the temporary data storage unit 12 to the re-encryption key generation apparatus 50 under the control of the control unit 16 (ST11). The key generation apparatus 10 uploads a public key $X_j$ of the decryption apparatus 50 in the temporary data storage unit 12 (ST12). Furthermore, a process similar to the process in steps ST10 to ST12 may be executed on a private key $x_h$ and a public key $x_h$ of the encryption apparatus 20 as necessary to transmit the private key $x_h$ to the encryption apparatus 20, while releasing the public key $x_h$.

The key setup process completes as described above. Subsequently, the apparatuses 20, 30, 40, and 50 may appropriately acquire and utilize the public parameters and public key uploaded in steps ST2, ST9, and ST12.

(2) The encryption process is executed by the encryption apparatus 20 as shown in FIG. 3 and steps ST21 to ST24.

That is, the encryption parameter generation unit 23 of the encryption apparatus 20 generates a key pair (ssk, svk)←Ĝ(λ) of a signature key ssk and a verification key svk in the one-time signature based on a security parameter λ and a key pair generation function Ĝ in the public parameters (ST21). The encryption parameter generation unit 23 sets the verification key svk in first encryption data $C_1$ ($C_1$=svk).

Furthermore, the encryption parameter generation unit 23 generates a first random number r∈$Z_p^*$ to deliver the first random number r∈$Z_p^*$ to the encrypted data generation unit 24.

Based on the first random number r, the encrypted data generation unit 24 generates second, third, and fourth encrypted data $C_2$, $C_3$, and $C_4$ shown below for a message m∈$G_T$ as plain data (ST22).

$$C_2 = X_i^r$$

$$C_3 = e(g,g)^r \cdot m$$

$$C_4 = (u^{svk} \cdot v)^r$$

Specifically, in step ST22, the encryption key generation unit 23 generates the second encrypted data $C_2$ based on the public key $X_i$ of the re-encryption key generation apparatus 30 and the first random number r. Furthermore, the encrypted data generation unit 24 generates the third encrypted data $C_3$ using the pairing function based on the generator g included in the public parameters, the first random number r, and the message m. Also, the encrypted data generation unit 24 generates the fourth encrypted data $C_4$ based on the generators u and v included in the public parameters, the verification key svk generated in step ST21, and the first random number r.

After step ST22 ends, the encrypted data generation unit 24 generates, for the third and fourth encrypted data $C_3$ and $C_4$, a one-time signature σ based on a signature generation function Ŝ in the public parameters the signature key ssk generated in step ST21 as shown below (ST23).

$$\sigma = \hat{S}(ssk,(C_3,C_4))$$

Subsequently, the encrypted data generation unit 24 generates encrypted data $C_i$=($C_1$, $C_2$, $C_3$, $C_4$, σ) including the first to fourth encrypted data $C_1$ to $C_4$ and the one-time signature σ, and writes the resultant encrypted data to the temporary data storage unit 21.

The communication unit 22 transmits the encrypted data $C_i$ in the temporary data storage unit 21 to the re-encryption apparatus 40 under the control of the control unit 25 (ST24).

The encryption process completes as described above.

(3) The re-encryption key generation process is executed by the re-encryption key generation apparatus 30 as shown in FIG. 4 and steps ST31 to ST33.

That is, the communication unit 33 of the re-encryption key generation apparatus 30 acquires the public key $X_i$ of the decryption apparatus 50 uploaded by the key generation apparatus 10 and writes the public key $X_i$ to the temporary data storage unit 32 under the control of the control unit 35 (ST31). Furthermore, in step ST5 described above, the communication unit 33 receives the private key $x_i$ of the re-encryption key generation apparatus 30 from the key generation apparatus 10 and writes the private key $x_i$ to the private key storage unit 31.

The re-encryption key generation unit 34 generate a re-encryption key $R_{ij}$ based on the private key $x_i$ of the re-encryption key generation apparatus 30 in the private key storage unit 31 and the public key $x_j$ of the decryption apparatus 50 in the temporary data storage unit 32 (ST32). The re-encryption key $R_{ij}$ is described by:

$$R_{ij} = X_j 1/x_i = g\, x_j/x_i, \text{ and}$$

Subsequently, the re-encryption key generation unit 34 writes the generated re-encryption key $R_{ij}$ to the temporary data storage unit 32. The communication unit 33 transmits the re-encryption key $R_{ij}$ in the temporary data storage unit 32 to the re-encryption apparatus 40 under the control of the control unit 35 (ST33).

The re-encryption key generation process completes as described above.

(4) The re-encryption process is executed by the re-encryption apparatus 40 as shown in FIG. 5 and steps ST41 to ST43.

The communication unit 43 of the encryption apparatus 40 writes the encrypted data transmitted in step ST24 and the re-encryption key $R_{ij}$ transmitted in step ST33 to the temporary data storage unit 42.

The re-encryption process unit 44 uses the public parameters and verification formulae shown below to verify the encrypted data $C_i$ in the temporary data storage unit 42 (ST41). In this case, the verification succeeds if the two verification formulae hold true. The verification fails if at least one of the verification formulae fails to hold true.

$$e(C_2, u^{C_1} \cdot v) \stackrel{?}{=} e(X_i, C_4)$$

$$\hat{V}(C_1, \sigma, (C_3, C_4)) \stackrel{?}{=} 1$$

Upon succeeding in the verification, the re-encryption process unit 44 generates a second random number t∈$Z_p^*$ and first, second, third, and fourth re-encrypted data $C_2'$, $C_2''$, $C_2'''$, $C_{2V}$ (ST42).

$$C_2' = X_i^t$$

$$C_2'' = R_{ij}^{1/t} = g^{(x_j/x_i)^{t-1}}$$

$$C_2''' = C_2^t = X_i^{rt}$$

$$C_{2V} = g^t$$

Specifically, in step ST42, the re-encryption process unit 44 generates the first re-encrypted data $C_2'$ based on the public key $X_i$ of the re-encryption key generation apparatus 30 and the second random number t. Furthermore, the re-encryption process unit 44 generates the second re-encrypted data $C_2''$ based on the re-encryption key $R_{ij}$ and the second random number t. Moreover, the re-encryption process unit 44 generates the third re-encrypted data $C_2'''$ based on the second encrypted data $C_2$ and the second random number t. Additionally, the re-encryption process unit 44 uses the second random number t to generate the fourth re-encrypted data $C_{2V}$.

After step ST42 ends, the re-encryption process unit 44 substitutes the first to fourth re-encrypted data $C_2'$ to $C_2'''$, $C_2V$ with the second encrypted data $C_2$ in the encrypted data $C_i$ to generate re-encrypted data $C_j$=($C_1$, $C_2'$, $C_2''$, $C_2'''$, $C_{2V}$, $C_3$, $C_4$, σ). The re-encryption process unit 44 then writes the resultant encrypted data to the temporary data storage unit 42.

The communication unit 43 transmits the re-encrypted data $C_j$ in the temporary data storage unit 42 to the decryption apparatus 50 under the control of the control unit 47 (ST43).

The re-encryption process completes as described above.

(5) The decryption process is executed by the decryption apparatus 50 as shown in FIG. 6 and steps ST51 to ST54. If step ST54 fails, steps ST55 and ST56 are further executed.

That is, the communication unit 53 of the decryption apparatus 50 receives the re-encrypted data $C_j$ transmitted in step ST43 to write the re-encrypted data $C_j$ to the temporary data storage unit 52.

The decryption process unit 54 verifies the re-encrypted data $C_j$ in the temporary data storage unit 52 using the public parameters and the public key $X_j$ of the decryption apparatus 50 as well as verification formulae shown below (ST51). The verification succeeds if the three verification formulae hold true, and fails if at least one of the verification formulae fails to hold true.

$$e(C'_2, C''_2) \stackrel{?}{=} e(X_j, g)$$

$$e(C'''_2, u^{C_1} \cdot v) \stackrel{?}{=} e(C''_2, C_4)$$

$$\hat{V}(C_1, \sigma, (C_3, C_4)) \stackrel{?}{=} 1$$

Upon succeeding in the verification, the decryption process unit 54 decrypts the message m from the re-encrypted data $C_j$ based on the private key $x_j$ of the decryption apparatus 50 as shown by Formula II (ST52).

$$m = C_3 / \left( e(C''_2, C'''_2)^{1/x_j} \right)$$

On the other hand, the communication unit 53 acquires the public key $X_i$ of the re-encryption key generation apparatus 30 uploaded by the key generation apparatus 10 to write the public key $X_i$ to the temporary data storage unit 52, under the control of the control unit 56. The public key $X_i$ of the re-encryption key generation apparatus 30 corresponds to the public key $X_i$ of the re-encryption key generation apparatus 30 having identification information i expected to be the destination of the encrypted data $C_i$ present before the process of re-encryption into the re-encrypted data $C_j$ is executed.

The encrypted data verification process unit 55 pre-holds a part of the re-encrypted data $C_j$ used for the re-encryption system, and such a formula as shown below holds true when the public key Xi, used for the encryption process executed on the encrypted data $C_i$ present before the process of re-encryption into the re-encrypted data $C_j$ is carried out, is substituted into the formula.

$$e(C'_2, g) = e(C_{2V}, X_i)$$

The left side and right side of the verification formula can be expressed as follows.

(Left side of the verification formula) = $e(g^{x_i \cdot t}, g) = e(g, g)^{x_i \cdot t}$ (Right side of the verification formula) = $e(g^t, g^{x_i}) = e(g, g)^{x_i \cdot t}$ Subsequently, the encrypted data verification process unit 55 performs a calculation based on the verification formula by substituting, into the verification formula, the part ($C_2'$, $C_{2V}$) of the re-encrypted data $C_j$ received from the re-encryption apparatus 40 and the public key $X_i$ of the re-encryption key generation apparatus 30 read from the temporary data storage unit 52, to determine whether or not the verification formula holds true. The encrypted data verification process unit 55 thus verifies for whom the re-encrypted data is originally destined (ST54).

The encrypted data verification process unit 55 outputs verification success indicating that the public key used for the encryption process executed on the message m as plain data is the public key $X_i$ of the re-encryption key generation apparatus 30 when the result of the determination indicates that the verification formula holds true.

Furthermore, when the result of the determination in step ST54 indicates that the verification formula does not hold true, the public key of another apparatus (for example, another re-encryption apparatus not shown in the drawings) is acquired (ST55), and verification similar to the verification in step ST54 is repeated (ST56). Thus, a re-encryption apparatus is identified which has a public key that allows the verification formula to hold true.

As described above, according to the first embodiment, the decryption apparatus 50 comprises the encrypted data verification process unit 55 that pre-holds the verification formula that holds true when the verification formula is calculated by substituting into the verification formula the part of the re-encrypted data $C_j$, the public key $X_i$ used for the encryption process executed on the encrypted data $C_i$ present before the re-encryption process is executed on the re-encrypted data $C_j$, and the private key $x_j$ that enables the re-encrypted data $C_j$ to be decrypted, the encrypted data verification process unit 55 verifying the verification formula. Thus, the decryption apparatus, upon receiving the re-encrypted data, can verify for whom the encrypted data that has been re-encrypted is originally destined.

In the first embodiment, the order of the processes may be changed. For example, the orders of the decryption process and the encrypted data verification process may be changed. Similarly, the order of the re-encryption key generation process may be changed such that the re-encryption key generation process precedes the encryption process.

Furthermore, the first embodiment may be changed to a form in which the encrypted data is decrypted without being re-encrypted as disclosed in Non-Patent Literature 8. In this case, the message m is decrypted by the private key $x_i$ of the re-encryption key generation apparatus 30 rather than by the decryption apparatus 50. For example, the re-encryption key generation apparatus 30 verifies the encrypted data as in the case of step ST41 and then decrypts the message m based on:

$$m = C_3 / (e(C_2, g)^{1/x_i})$$

That is, the re-encryption system according to the present embodiment can be implemented by adding the process executed by the re-encryption process unit 44 to generate $C_{2V}$ and the encrypted data verification process unit 55 to the technique described in Non-Patent Literature 8.

In addition, according to the first embodiment, even if the re-encryption key generation apparatus 30 decrypts the encrypted data without executing the re-encryption process, verification of encrypted data as shown by Formula 14 allows the system to determine that the public key originally used for the encrypted data is the public key $X_i$ of the re-encryption key generation apparatus 30.

$$e(C'_2, g) = e(C_{2V}, X_i))$$

The left and right sides of Formula 14 can be expressed as follows.

(Left side of Formula 14) = $e(g^{x_i \cdot t}, g) = e(g, g)^{x_i \cdot t}$ (Right side of Formula 14) = $e(g^t, g^{x_i}) = e(g, g)^{x_i \cdot t}$ (Second Embodiment)

Now, a re-encryption system according to a second embodiment will be described using FIG. 1 described above. The second embodiment is a modification of the first embodiment in which the public key $X_i$ of the re-encryption key generation apparatus 30 is pre-embedded in the message m so that any re-encryption system can verify for whom the encrypted data is originally destined.

Specifically, the encrypted data generation unit 24 of the encryption apparatus 20 has a function to execute the above-described encryption process on the message m as plain data in which the public key $X_i$ of the re-encryption key generation apparatus 30 is embedded. The embedding process may be, for example, a process of generating a digital watermark or a process of simply adding (concatenating) the public key $X_i$ or the encrypted data in the public key $X_i$ to the message m. For example, if the encrypted data generation unit 24 creates the encrypted data in the public key $X_i$ by encrypting the public key $X_i$ of the re-encryption key generation apparatus 30 using the private key $X_h$ of the encryption apparatus 20, the decryption apparatus 50 performs decryption using the public key $X_h$ of the encryption apparatus 20 to enable the public key $X_i$ of the re-encryption key generation apparatus 30 to be extracted.

Figure 7:
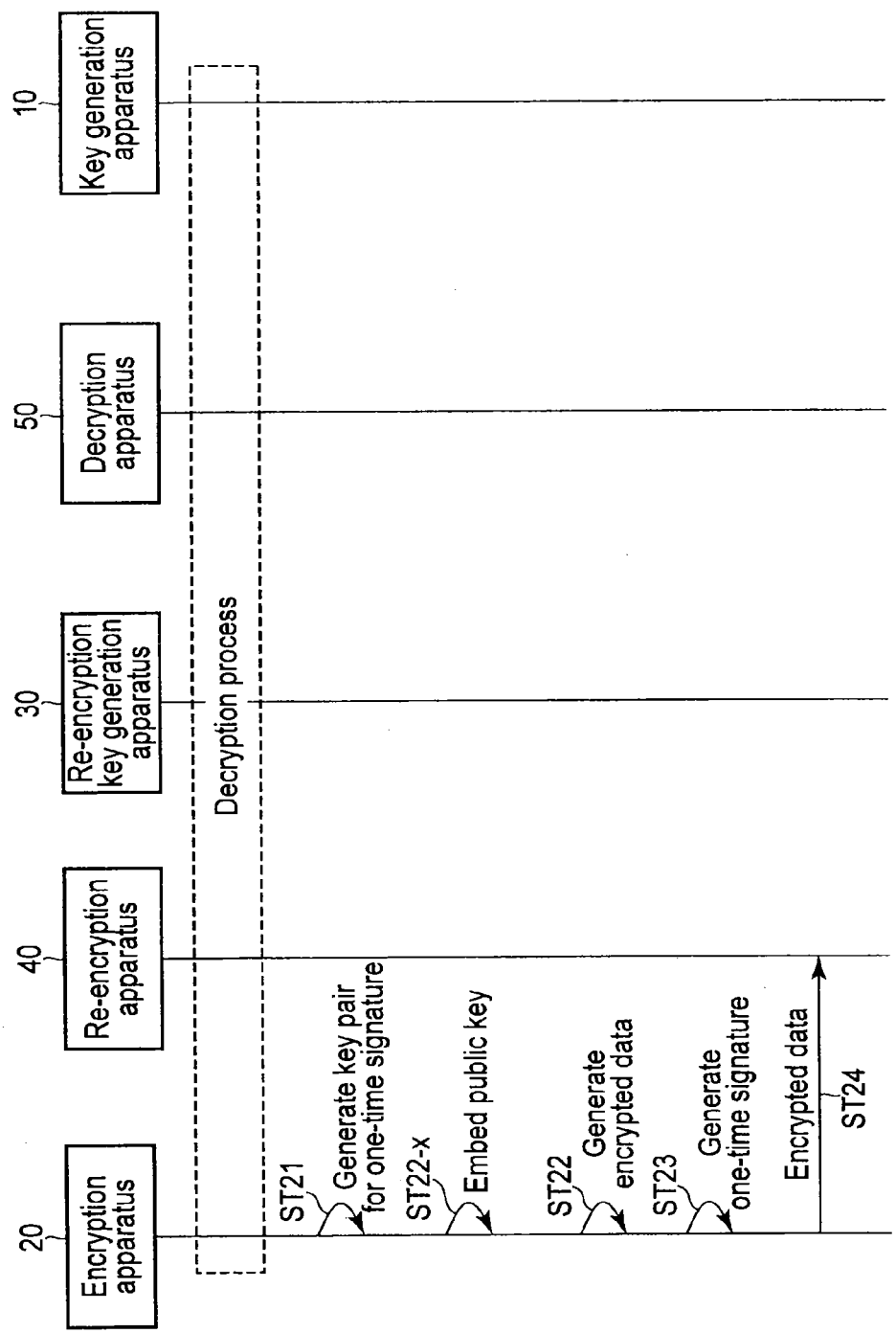
FIG. 7 is a sequence diagram illustrating the operation of an encryption process according to a second embodiment.

In connection with this, the control unit 25 of the encryption apparatus 20 has a function to control the units 21 to 24 so that the units 21 to 24 perform operations shown in FIG. 7.

On the other hand, the encrypted data verification process unit 55 of the decryption apparatus 50 has functions (f55-4) to (f55-6) instead of the holding function (f55-1), determination function (f55-2), and output function (f55-3) described above.

(f55-4) An extraction function to extract the embedded public key $X_i$ from the message m decrypted by the above-described decryption function.

(f55-5) A comparison function to compare the extracted public key $X_i$ with the public key $X_i$ of the re-encryption key generation apparatus 30 read from the temporary data storage unit 52.

(f55-6) A function to output verification success indicating that the public key $X_i$ used for the encryption process executed on the message m is the public key $X_i$ of the re-encryption key generation apparatus 30 when the result of the comparison indicates that the extracted public key $X_i$ matches the public key $X_i$ of the re-encryption key generation apparatus 30.

Figure 8:
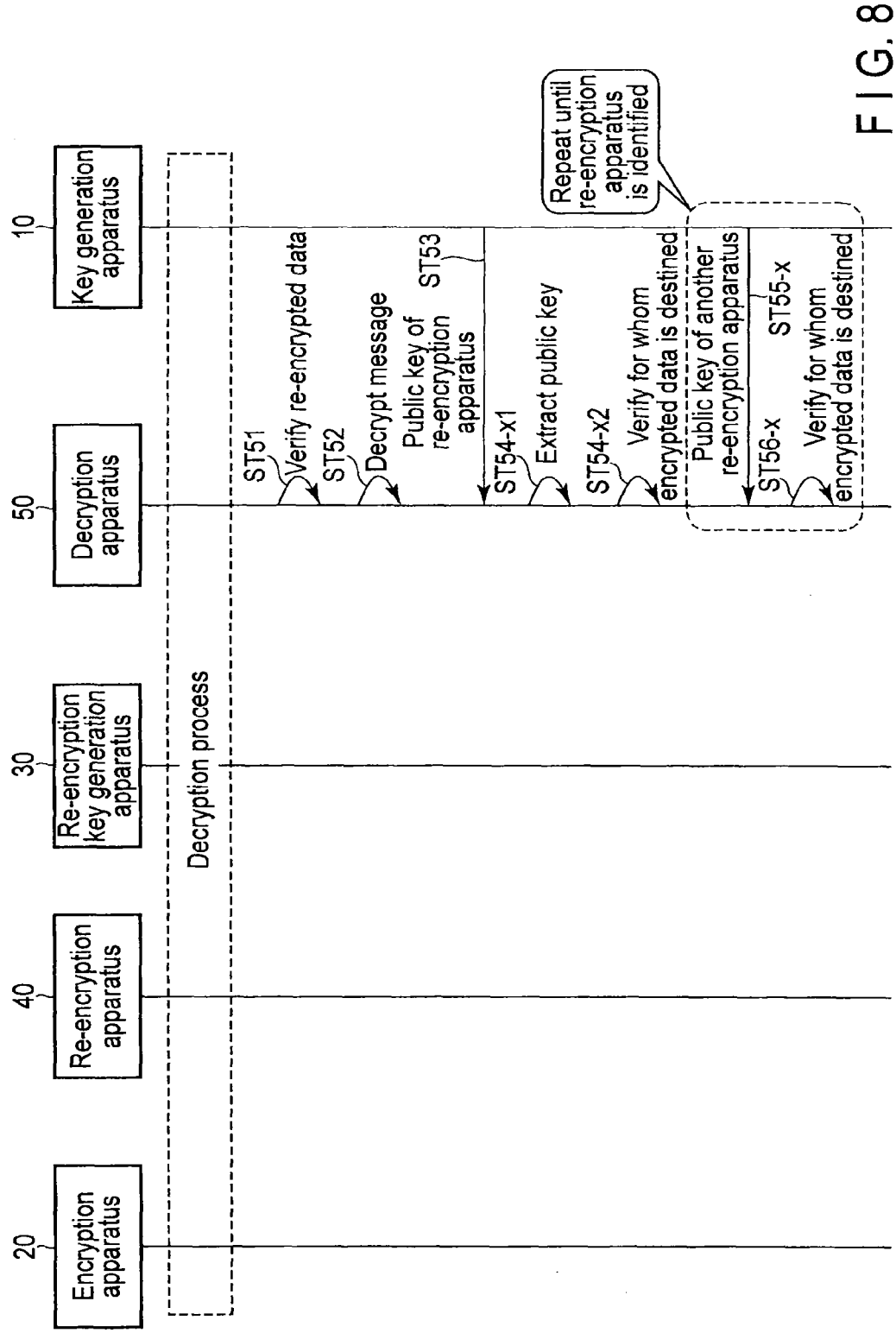
FIG. 8 is a sequence diagram illustrating the operation of a decryption process according to the second embodiment.
Figure 9:
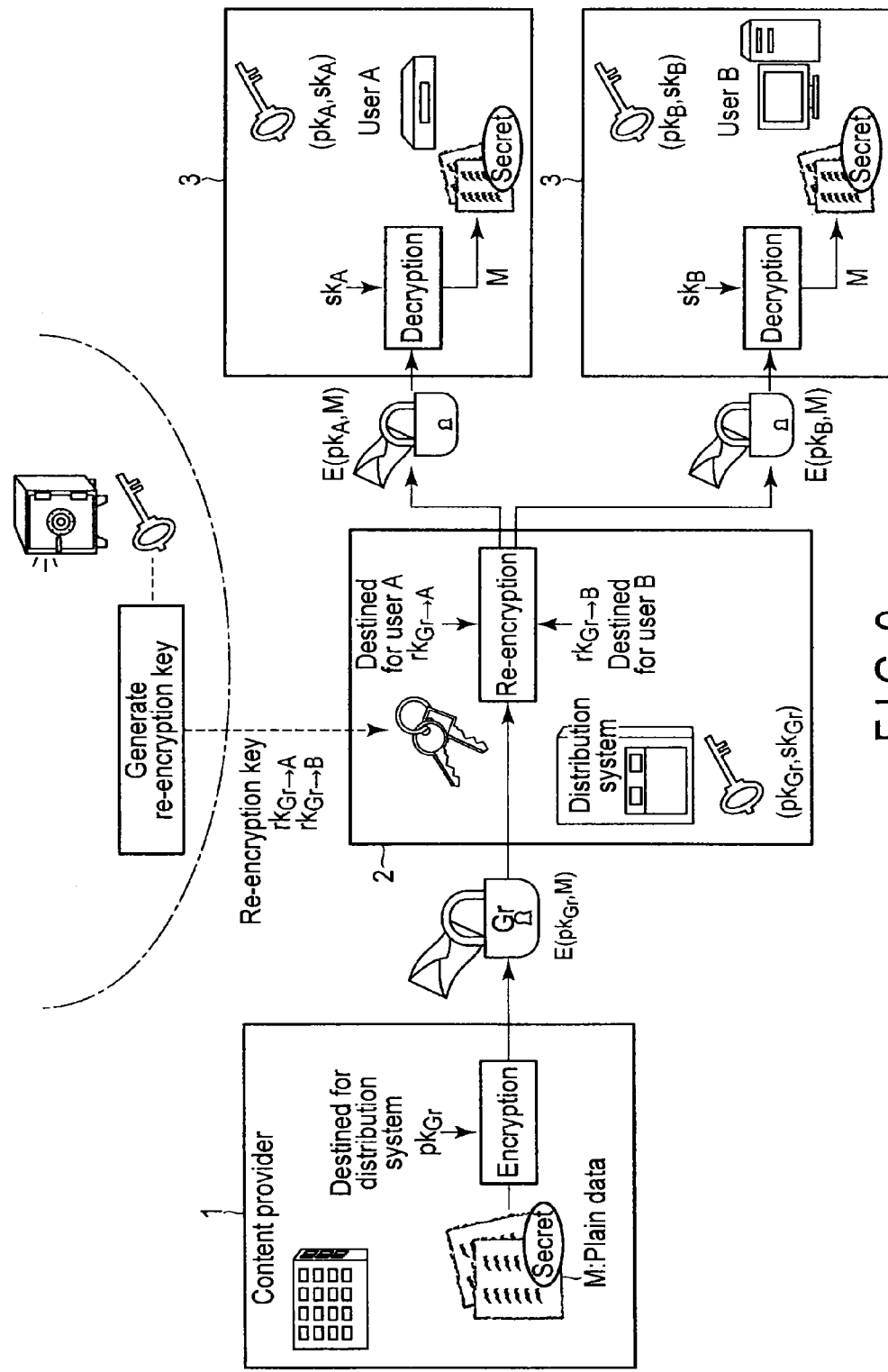
FIG. 9 is a schematic diagram showing an example of a content distribution system illustrating a general re-encryption technique.

In connection with this, the control unit 56 of the decryption apparatus 50 has a function to control the units 51 to 55 so that the units 51 to 55 perform operations shown in FIG. 8.

Next, operations of the re-encryption system configured as described above will be described using sequence diagrams in FIG. 7 and FIG. 8.

(1) The key setup process operates as described above.

(2) Step ST21 of the encryption process operates as described above.

After step ST21 ends, the encrypted data generation unit 24 of the encryption apparatus 20 embeds the public key $X_i$ of the re-encryption key generation apparatus 30 in the message m as plain data (ST22-x), and then performs the operation in step ST22 described above on the message m with the public key $X_i$ embedded therein as shown in FIG. 7.

That is, the encrypted data generation unit 24 generates the second, third, and fourth encrypted data $C_2$, $C_3$, and $C_4$ for the message with the public key $X_i$ embedded therein m∈$G_T$ based on the first random number r, as described above (ST22).

Steps ST23 and ST24 of the encryption process operate as described above.

The (3) re-encryption key generation process and the (4) re-encryption process operate as described above.

Steps ST51 to ST53 of the (5) decryption process operate as described above.

After step ST53 ends, the encrypted data verification process unit 55 of the decryption apparatus 50 extracts the embedded public key $X_i$ from the decrypted message m as shown in FIG. 8 (ST54-x1).

The encrypted data verification process unit 55 compares the extracted public key $X_i$ with the public key $X_i$ of the re-encryption key generation apparatus 30 read from the temporary data storage unit 52 to verify for whom the re-encrypted data is originally destined (ST54-x2).

The encrypted data verification process unit 55 outputs verification success indicating that the public key used for the encryption process executed on the message m is the public key $X_i$ of the re-encryption key generation apparatus 30 when the result of the comparison indicates that the extracted public key $X_i$ and the public key $X_i$ of the re-encryption key generation apparatus 30 match.

Furthermore, when the result of the determination in step ST54-x2 indicates that the extracted public key $X_i$ and the public key $X_i$ of the re-encryption key generation apparatus 30 fail to match, the public key of another apparatus (for example, another re-encryption apparatus not shown in the drawings) is acquired (ST55-x) and written to the temporary data storage unit 52, and verification similar to the verification in step ST54-x2 is repeated (ST56-x). Thus, a re-encryption apparatus is identified which has a public key that matches the extracted public key.

As described above, according to the second embodiment, the encryption apparatus 20 comprises the encrypted data generation unit 24 that embeds the public key $X_i$ of the re-encryption key generation apparatus 30 in the message m as plain data and then performs the above-described encryption process on the message m with the public key $X_i$ embedded therein. Furthermore, the decryption apparatus 50 comprises the encrypted data verification process unit 55 that extracts the embedded public key $X_i$ from the decrypted message m and performs verification by comparing the extracted public key $X_i$ with the public key $X_i$ of the re-encryption key generation apparatus 30 read from the temporary data storage unit 52. Thus, according to the second embodiment, since the encryption apparatus 20 and the decryption apparatus 50 as described above are provided, the decryption apparatus, upon receiving the encrypted data, can verify for whom the encrypted data that has been re-encrypted is originally destined.

According to at least one of the above-described embodiments, in the re-encryption system, the decryption apparatus, upon receiving the re-encrypted data, can verify for whom the encrypted data that has been re-encrypted is originally destined.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An at least one non-transitory computer readable medium including a re-encrypted data verification program used in a re-encryption system comprising an encryption apparatus executing an encryption process on plain data using a public key corresponding to a private key of a re-encryption key generation apparatus and transmitting resultant encrypted data to a re-encryption apparatus, the re-encryption apparatus then executing a re-encryption process on the encrypted data using a re-encryption key without decrypting the encrypted data and transmitting resultant re-encrypted data to a decryption apparatus, the decryption apparatus executing a verification process on the re-encrypted data using a public key of the re-encryption apparatus, and executing a decryption process on the re-encrypted data using a private key corresponding to a public key of the decryption apparatus to obtain the plain data, the re-encrypted data verification program being executed by a processor in the decryption apparatus comprising a storage device storing the public key of the re-encryption key generation apparatus and the private key of the decryption apparatus, the re-encrypted data verification program being stored in a non-transitory computer-readable storage medium, the re-encrypted data verification program, when executed by the re-encryption system, causes the re-encryption system to perform the steps of:

a first program code of the re-encrypted data verification program allowing the processor to execute a process of holding at least one program instruction including a verification formula, the verification formula holding true when being calculated by substituting into the verification formula, a part of the re-encrypted data used for the re-encryption system and the public key used for the encryption process executed on the encrypted data before the re-encryption process is executed on the re-encrypted data;

a second program code of the re-encrypted data verification program allowing the processor to execute a process of performing a calculation based on the verification formula by substituting into the verification formula, the part of the re-encrypted data received from the re-encryption apparatus and the public key of the re-encryption key generation apparatus read from the storage device, to determine whether or not the verification formula holds true; and a third program code of the re-encrypted data verification program allowing the processor to execute a process of outputting detection success indicating that the public key used for the encryption process executed on the plain data is the public key of the re-encryption key generation apparatus when a result of the determination indicates that the verification formula holds true.

2. The at least one non-transitory computer readable medium including the re-encrypted data verification program according to claim 1, wherein, when the private key and public key of the re-encryption key generation apparatus are represented by $x_i$ and $X_i$ (where, when bilinear map groups satisfying a prime order $p>2^\lambda$ are represented by $G$ and $G_T$ and a first generator is represented by $g \in G$, based on a security parameter $\lambda$, public parameters ($p$, $\lambda$, $G$, $G_T$, $g$, $u$, $v$, Sig)), the plain data is represented by $m \in G_T$, the encrypted data is represented by $C_i=(C_1, C_2, C_3, C_4, \sigma)$ (where, when a signature key and a verification key in a one-time signature are represented by ssk and svk, a multiplicative group for a prime number p is represented by $Z_p^*$, a first random number is represented by $r \in Z_p^*$, a pairing function is represented by $e(,)$, a second generator and a third generator are represented by $u, v \in G$, respectively, and a signature generation function of the one-time signature is represented by $\hat{S}$, for $C_1 = svk$, $C_2 = X_i^r$, $C_3 = e(g,g)^r \cdot m$, $C_4 = (u^{svk} \cdot v)^r$, $\sigma = \hat{S}(ssk, C_3, C_4))$, and when the private key and public key of the decryption apparatus are represented by $x_j$ and $X_j$ (where: $X_i = g^{x_i}$, $X_j = g^{x_j}$), the re-encryption key is represented by:

$R_{ij} = X_j \; 1/x_i = g \; x_j/x_i$, and the re-encrypted data is represented by $C_j=(C_1, C_{2'}, C_{2''}, C_{2'''}, C_{2V}, C_3, C_4, \sigma)$ (where a second random number is represented by $t \in Z_p^*$), for $$C'_2 = X_i^t,$$

$$C''_2 = R_{ij}^{1/t} = g^{(x_j/x_i)^{t-1}},$$

$$C'''_2 = C_2^t = X_i^{rt},$$

$$C_{2V} = g^t, \text{ and}$$

the verification formula is represented by:

$$e(C'_2, g) = e(C_{2V}, X_i).$$

3. A re-encryption apparatus using a re-encrypted data verification program, the re-encryption apparatus comprising:
a verification program storage device which stores the re-encrypted data verification program; and
a verification program distribution device which distributes the re-encrypted data verification program in the verification program storage device to a decryption apparatus upon receiving a distribution request for the re-encrypted data verification program from the decryption apparatus, wherein
the re-encrypted data verification program includes
a first program code allowing a processor in a decryption apparatus to execute a process of holding a program code including a verification formula, the verification formula holding true when being calculated by substituting into the verification formula, a part of re-encrypted data used for the decryption apparatus and a public key used for an encryption process executed on encrypted data before an re-encryption process is executed on the re-encrypted data using a re-encryption key;
a second program code allowing the processor to execute a process of performing a calculation based on the verification formula by substituting into the verification formula, the part of the re-encrypted data received from the re-encryption apparatus and a public key of an re-encryption key generation apparatus, to determine whether or not the verification formula holds true; and
a third program code allowing the processor to execute a process of outputting detection success indicating that the public key used for the encryption process executed on plain data is the public key of the re-encryption key generation apparatus when a result of the determination indicates that the verification formula holds true.

4. The re-encryption apparatus according to claim 3,
wherein, when a private key and the public key of the re-encryption key generation apparatus are represented by $x_i$ and $X_i$ (where, when bilinear map groups satisfying a prime order $p>2^\lambda$ are represented by G and $G_T$ and a first generator is represented by g∈G, based on a security parameter $\lambda$, public parameters (p, $\lambda$, G, $G_T$, g, u, v, Sig)),
the plain data is represented by m∈$G_T$,
the encrypted data is represented by $C_i=(C_1, C_2, C_3, C_4, \sigma)$ (where, when a signature key and a verification key in a one-time signature are represented by ssk and svk, a multiplicative group for a prime number p is represented by $Z_p^*$, a first random number is represented by r∈$Z_p^*$, a pairing function is represented by e(,), a second generator and a third generator are represented by u, v∈G, respectively, and a signature generation function of the one-time signature is represented by Ŝ, for $$C_1 = svk,$$

$$C_2 = X_i^r,$$

$$C_3 = e(g,g)^r \cdot m,$$

$$C_4 = (u^{svk} \cdot v)^r,$$

$$\sigma = \hat{S}(ssk, C_3, C_4)), \text{ and}$$

when a private key and public key of the decryption apparatus are represented by $x_j$ and $X_j$ (where: $X_i = g^{x_i}$, $X_j = g^{x_j}$),
the re-encryption key is represented by:

$$R_{ij} = X_j 1/x_i = g^{x_j/x_i}, \text{ and}$$

the re-encrypted data is represented by $C_j=(C_1, C_2', C_2'', C_2''', C_{2V}, C_3, C_4, \sigma)$ (where a second random number is represented by t∈$Z_p^*$), for $$C'_2 = x_i^t,$$

$$C''_2 = R_{ij}^{1/t} = g^{(x_j/x_i)^{t-1}},$$

$$C'''_2 = C_2^t = X_i^{rt},$$

$$C_{2V} = g^t, \text{ and}$$

the verification formula is represented by:

$$e(C'_2, g) = e(C_{2V}, X_i).$$

5. A re-encryption system comprising an encryption apparatus, a re-encryption key generation apparatus, a re-encryption apparatus, and a decryption apparatus, wherein
the encryption apparatus is comprised of:
a first storage device which stores a public key of the re-encryption key generation apparatus;
an encryption device which executes an encryption process on plain data using the public key of the re-encryption key generation apparatus read from the first storage device, to obtain encrypted data; and
a first device which transmits the resultant encrypted data to the re-encryption apparatus,
the re-encryption key generation apparatus comprising:
a second storage device which stores a private key corresponding to the public key of the re-encryption key generation apparatus and a public key corresponding to a private key of the decryption apparatus;
a second device which generates a re-encryption key using the private key of the re-encryption key generation apparatus and the public key of the decryption apparatus both read from the second storage device; and
a third device which transmits the generated re-encryption key to the re-encryption apparatus,
the re-encryption apparatus comprising:
a third storage device which stores the re-encryption key received from the re-encryption key generation apparatus;
a re-encryption device which, upon receiving the encrypted data from the encryption apparatus, executes a re-encryption process on the encrypted data using the re-encryption key read from the third storage device without decrypting the encrypted data, to obtain re-encrypted data; and
a fourth device which transmits the resultant re-encrypted data to the decryption apparatus, and
the decryption apparatus comprising:

a fourth storage device which stores the public key of the re-encryption key generation apparatus and the private key of the decryption apparatus;

a decryption device which, upon receiving the re-encrypted data from the re-encryption apparatus, executes a decryption process on the re-encrypted data based on the private key of the decryption apparatus read from the fourth storage device, to obtain the plain data;

a holding device which holds a verification formula that holds true when the verification formula is calculated by substituting, into the verification formula, a part of the re-encrypted data used for the re-encryption system and the public key used for the encryption process executed on the encrypted data before the re-encryption process is executed on the re-encrypted data;

a determination device which performs a calculation based on the verification formula read from the holding device by substituting, into the verification formula, a part of the re-encrypted data received from the re-encryption apparatus and the public key of the re-encryption key generation apparatus read from the fourth storage device, to determine whether or not the verification formula holds true; and an output device which outputs verification success indicating that the public key used for the encryption process executed on the plain data is the public key of the re-encryption key generation apparatus when a result of the determination indicates that the verification formula holds true.

6. The re-encryption system according to claim 5, further comprising a key generation apparatus that generates a pair of a public key and a private key for each of the re-encryption and decryption apparatuses.

* * * * *